United States Patent [19]

Bruning

[11] 4,046,185
[45] Sept. 6, 1977

[54] TEMPORARY DOOR INSTALLATION FOR GRAIN CARRYING FREIGHT CAR

[75] Inventor: William E. Bruning, Omaha, Nebr.

[73] Assignee: OMNI Corporation, Omaha, Nebr.

[21] Appl. No.: 515,573

[22] Filed: Oct. 17, 1974

[51] Int. Cl.² .............................................. E06B 3/00
[52] U.S. Cl. ............................................... 160/368 G
[58] Field of Search .............. 160/368 G; 52/290, 273

[56] References Cited

U.S. PATENT DOCUMENTS

| 1,739,077 | 12/1929 | Lisher et al. | 52/273 |
| 3,390,715 | 7/1968 | Murphy | 160/368 G |
| 3,451,544 | 6/1969 | Sutter et al. | 160/368 G X |
| 3,483,664 | 12/1969 | Funk et al. | 52/273 X |
| 3,747,481 | 7/1973 | Tonking, Jr. | 160/368 G X |

Primary Examiner—Philip C. Kannan
Attorney, Agent, or Firm—Tilton, Fallon, Lungmus, Chestnut & Hill

[57] ABSTRACT

A temporary door installation for a grain carrying freight car wherein the pry board is upwardly tapered to eliminate the need for special sealing.

2 Claims, 2 Drawing Figures

TEMPORARY DOOR INSTALLATION FOR GRAIN CARRYING FREIGHT CAR

BACKGROUND AND SUMMARY OF INVENTION

Grain is often transported in boxcars equipped with sliding stormdoors. To retain the grain within the car it has been the practice to install a temporary barricade across the inside of the doorway opening. When the car comes to a grain center such as Chicago, the grain must be sampled and for this purpose, an artisan must enter the car. Frequently, difficulty is experienced in opening the sliding stormdoors — not only because of the warpage, rust, etc. that normally attends doors exposed to all types of weather, but also because of the bulging of the temporary barricade inside. To overcome this difficulty, it has been the practice to install a pryboard at the bottom of the door which is used by the artisan as a fulcrum for a pry-bar in edging open the sliding stormdoor. More particularly, a pointed bar is thrust into the pry-board and the leverage developed is used to open the sliding stormdoor. After the door has been opened sufficiently to permit the entry of the artisan, he climbs over the temporary barricade in order to obtain the sample. Here it will be appreciated that the temporary barricade does not extend to the very top of the doorway opening, but terminates a spaced distance below. This is necessary to permit the grain to be delivered into the car initially. However, the temporary barricade is normally incapable of supporting the artisan's weight and hence a second board, viz., the climb board, is positioned across the doorway opening.

In the past, pry-boards have been located in two positions: (1) against the outer surface of the temporary barricade as seen in U.S. Pat. No. 2,797,749, or (2) against the inner surface of the temporary barricade as seen in U.S. Pat. No. 2,966,214. Disadvantages have attended both types of installation. With the pry-board against the outside surface of the temporary door, the door has to be creased or bent around the top of the pry-board creating a space which has to be sealed with caulking paper or the like. With the other version, where the pry-board is positioned against the inside surface of the door, it will be apparent that the door itself must be breached by having the pry bar penetrate therethrough in order to get the necessary leverage. This destroys the desirable integrity of the door and could cause grain leakage.

According to the invention, an upwardly tapered pry-board is employed against the outer surface of the door which eliminates all of the foregoing difficulties. In the preferred embodiment, a single board or timber is cut diagonally to provide two halves with one half being used as the pry-board and the remaining half as the climb board.

DETAILED DESCRIPTION OF INVENTION

Figure 1:
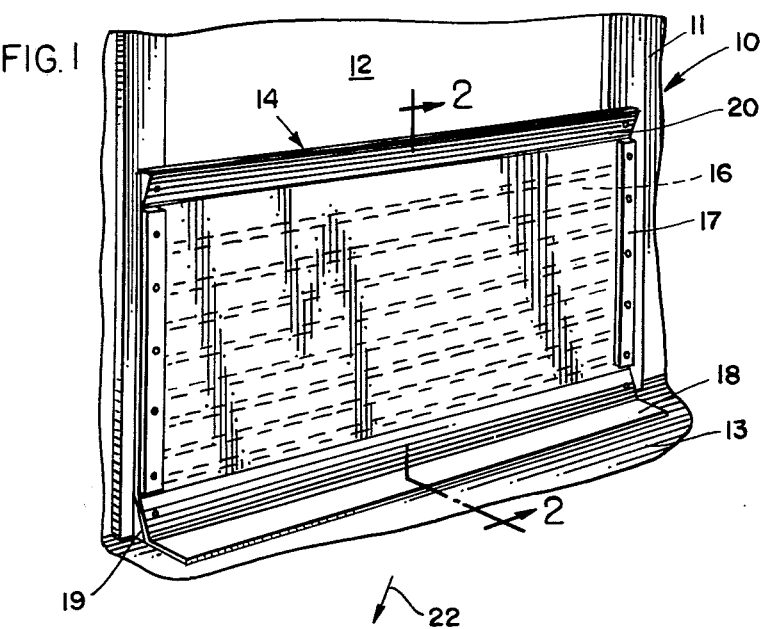
Figure 2:
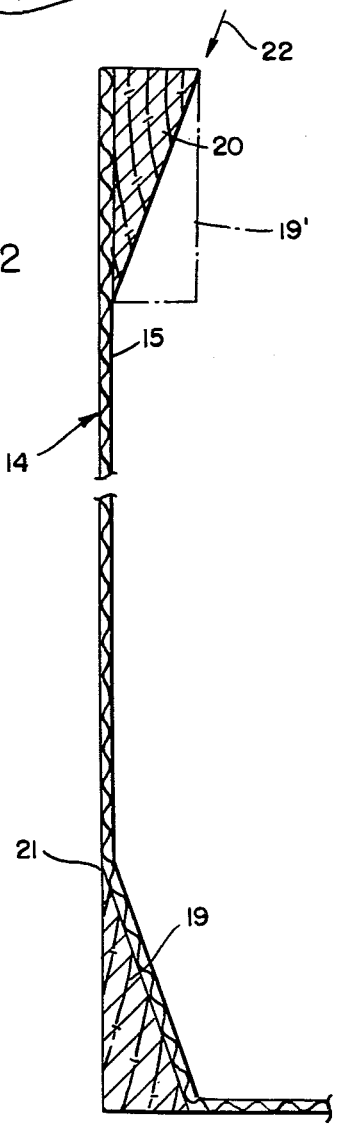

The invention is described in conjunction with an illustrative embodiment in the accompanying drawing, in which FIG. 1 is a fragmentary perspective view of the interior of a grain carrying freight car equipped with a temporary door according to the teachings of the instant invention; and FIG. 2 is an enlarged fragmentary sectional view taken along the line 2—2 of FIG. 1.

In the illustration given, the numeral 10 designates generally a grain carrying freight vehicle, shown only in the pertinent parts thereof. These parts include a sidewall 11 which is interrupted to provide a doorway opening 12 extending downwardly to the usual floor 13.

Extending across the doorway opening 12 is a temporary barricade generally designated 14. The barricade 14 is advantageously constructed of a corrugated medium 15 (see FIG. 2) and is further equipped with horizontally extending flat metal straps 16 (shown only in FIG. 1). The temporary barricade 14 extends across the doorway opening 12 and is secured to door posts or other framing members associated with the wall 11. Usually, side battens 17 are employed to completely effect the securement. Also, the temporary barricade, or door, is of sufficient height as to develop a bottom drape or floor flap 18 which extends around the previously mentioned pry-board 19. Completing the assembly is the climb board 20 which extends across the top portion of the temporary door 14.

As can be best appreciated from FIG. 2, the pryboard 19 is upwardly tapered so that there is no gap at the upper edge thereof, i.e., in the portion designated 21 where, in the previous installations, a gap did exist and it was necessary to use caulking paper.

In the practice before the invention, both the pryboard and climb board were constructed of standard 1 inch by 6 inches lumber. I find it advantageous to utilize a somewhat thicker piece of lumber such as a resawn 2 inches by 6 inches piece of lumber which actual dimensions of 1⅝ inches by 5⅝ inches. This then is cut diagonally to provide both the pry-board 19 and climb board 20. Alternatively, it is possible to use resawn rough cut lumber having actual cross sectional dimensions of 2 inches by 6 inches. To indicate the type of cut contemplated, the upper portion of FIG. 2 has been augmented with the remainder of the piece of lumber which provided the climb board 20, the remaining portions being shown in dotted line and designated 19'. With a rectangular cross-sectioned piece such as this, a saw cut in the direction of the arrow designated 22 will develop both of the pry-board and climb board from a single piece of lumber.

In this way I develop two triangular cross sectional shapes from the same piece of lumber, and relative to the portion utilized for the pry-board avoid the need for creasing the flexible temporary door in the area adjacent the top of the pry-board (and also eliminating the caulking) while relative to the climb board provide a structure of sufficient strength to support the weight of the artisan entering the car.

I claim:

1. In combination, a freight vehicle having a floor and a wall having door posts defining a doorway opening, a flexible temporary door installed across said doorway interiorily of said vehicle and secured to said wall door posts, and an upwardly tapered pry-board mounted across said doorway adjacent said floor and secured to said wall door posts, between said wall door posts and said door whereby said door is relatively uncreased in the area adjacent the top of said pry-board and provides a door to door post seal.

2. The structure of claim 1 wherein a climb board having a downward taper in cross section complementary to said pry-board is installed across the top of said door and secured to said wall door posts.

* * * * *